Aug. 31, 1926.
R. H. BLAIR
1,597,667
NUT LOCKING BOLT STRUCTURE
Filed May 19, 1926
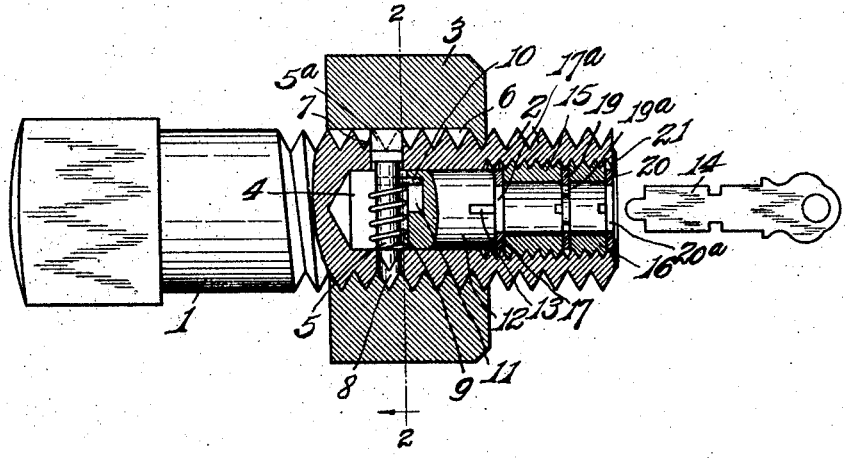
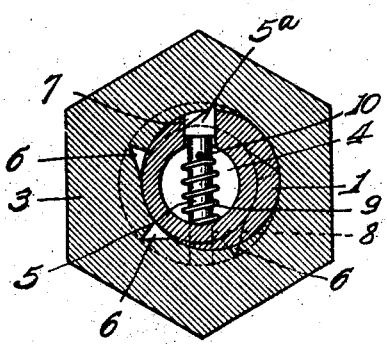
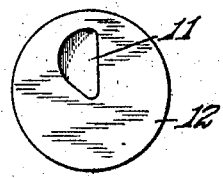
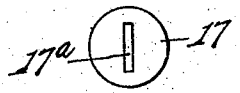
INVENTOR
Ray H. Blair
BY
N. E. Dunlap
ATTORNEY Patented Aug. 31, 1926.

1,597,667

UNITED STATES PATENT OFFICE.

RAY H. BLAIR, OF CAMBRIDGE, OHIO.

NUT-LOCKING BOLT STRUCTURE.

Application filed May 19, 1926. Serial No. 110,084.

This invention relates to nut locking devices, and it has for its primary object to provide a bolt and nut structure having key controlled means whereby the nut may be locked in adjusted position upon the bolt for positively preventing retraction of the former, and which may be unlocked by the use of the key to render the nut readily removable.

In describing the invention in detail, reference is herein had to the accompanying drawings, in which—

Figure 1 is a longitudinal section of the invention, showing the nut locked upon the bolt;

Figure 2 is a section on line 2—2, Fig. 1;

Figure 3 is an inner face view of the rotatable pin-shifting member, enlarged; and—

Figure 4 is a face view of an apertured disk.

Referring to said drawings, 1 designates a bolt having the usual screw threads 2 upon which a nut 3 is adjustable as ordinarily. A central bore 4 is provided in the threaded end of the bolt, extending from the end to a point adjacent to that at which the threads 2 terminate, as shown.

Extending diametrically through the threaded end of the bolt 1 at an appropriate distance from the outer end of the bore 4 is a shiftable spring-pressed pin 5 having a pawl end 5$^a$ adapted, as the nut 3 is rotated forward thereover, successively to engage in thread-intersecting grooves 6 provided in spaced relation in said nut. Said locking pin has its end 5$^a$ non-rotatably received in a hole 7 in the bolt and its opposite end received in a hole 8 in said bolt, said holes being located in alined relation. A coil spring 9 embraces the body of said locking pin within the bore 4, being seated at one end upon the internal face of the walls of the bolt and at its other end against a stud 10 which is carried by said pin and which, in the normal position of the latter, occupies a non-central position within the bore 4, as shown.

The stud 10 is received within a socket 11 provided therefor in the inner end of a cylindrical member 12 which is more or less snugly received and rotatable within the bore 4. The outer end of said member 12 has therein a cross kerf 13 adapted for the reception of the inner end of a key 14 whereby said member may be manually rotated for shifting the locking pin against the tension of the spring 9 for effecting withdrawal of the pawl end 5$^a$ from locking engagement with a groove 6 of the nut, thereby to release the latter to the extent that it may be retracted. Said socket 11 has a cam formation, as is clearly shown in Fig. 3. Thus, due to the pressure exerted by the spring 9, the locking pin, acting through the stud 10, normally maintains the rotatable member 12 in the position in which said stud occupies a position in said socket farthest remote from the center of the bore 4 of the bolt. Forward rotation of the member 12, effected by means of the key 14, causes the curved cam wall 11$^a$ of the socket 11 to travel upon the stud 10 and thereby to actuate sliding movement of the locking pin against the pressure exerted by the spring 9 for effecting withdrawal of the pawl from locking relation to the nut 3.

As herein shown, the bolt 1 is internally threaded at the outer end portion of the bore 4, and threaded into said bore is one or more tubular members, two such members 15 and 16 being shown in the drawings. Interposed between the member 15 and the rotatable member 12 is a freely rotatable disk 17 having therein an aperture or slot 17$^a$ of a form and size to accomomdate the passage of the key 14. A similar rotatable disk 19 is interposed between the adjacent members 15 and 16 where two such members are employed, and another such disk 20 is disposed against the outer end of the outermost member, as 16. The various adjustable members and the disks are permanently held in place within the bore 4 in any suitable manner, as by means of a securing ring 21 fixed, as by spot-welding to the outer end of the bolt 1 and having its inner peripheral edge portion abutting the outer face of the disk 20 adjacent to the outer edge of the latter.

As is manifest, introduction of the flat form of key 14 employed for actuating the locking pin to nut-unlocking position requires that the various disks 20, 19 and 17 occupy positions in which their apertures or slots 20$^a$, 19$^a$ and 17$^a$, respectively, aline with the kerf 13 of the rotatable member 12. Therefore, following introduction of the key through the slot of disk 20, the latter is rotated by means of said key to the position wherein its slot 20$^a$ becomes alined with the slot 19$^a$ of the disk 19, whereupon said key is projected through the latter. Then, both of said disks must be rotated to a point at which their slots aline with the slot 17ª of disk 17, following which all of said disks must be rotated into alinement with the kerf 13. With the disks so disposed, the end of the key is inserted in said kerf in position for actuating rotation of the member 12.

The nut may be advanced over the bolt in the usual manner, and in such advance travel over the pawl-end of the locking pin in the manner of an advancing ratchet over its pawl, said pin being forced inward against the pressure exerted by its spring following each successive outward spring-actuated movement thereof into seated relation to the grooves of the nut. However, due to the radial disposition of the rear walls of the grooves and the corresponding form of the front face of the pawl, retraction of the nut is effectually prevented until the locking pin is withdrawn from locking position.

The structure hereinbefore described is designed for use where bolt-held parts are to be positively secured against unauthorized removal, as, for instance, in securing pneumatic tire rims upon the wheels of a vehicle. As is manifest, one such nut-locking bolt structure employed together with a plurality of the usual tire-rim securing bolts will suffice to effectually prevent theft of a tire from the wheel of an automobile.

What is claimed is—

1. A nut-locking bolt structure comprising a bolt having a threaded end portion and having a central longitudinal bore in said portion, said bolt being also provided with transversely extending alined holes opening into said bore adjacent to the inner end of the latter, a lengthwise shiftable pin having its ends received in said holes and having a pawl-like end, a nut threaded for adjustment on said bolt and having threaded intersecting grooves adapted for the reception of said pawl-like end of the pin, tension means normally tending to maintain said pin in its outwardly shifted position, means rotatable within the bore of the bolt for effecting shifting of said pin against the pressure of said tension means, said shifting means having therein a seat for the reception of a key whereby it may be rotated, and a plurality of rotatable elements in said bore having therein key-entering slots which, when alined with said key seat, permit entrance of the key to the latter.

2. A nut-locking bolt structure comprising a bolt having a threaded end portion and having a central longitudinal bore in said portion, said bolt being also provided with transversely extending alined holes opening into said bore adjacent to the inner end of the latter, a lengthwise shiftable pin having its ends received in said holes and having a pawl-like end, a nut threaded for adjustment on said bolt and having thread intersecting grooves adapted for the reception of said pawl-like end of the pin, tension means normally tending to maintain said pin in its outwardly shifted position, a stud carried by said pin, a member rotatably mounted in said bore adjacent to said pin and having in the inner end thereof a cam socket for the reception of said stud, said member having a key receiving kerf in the opposite end thereof, a key, and a plurality of elements rotatably mounted in the outer end of said bore and having therein key passages which, when in alined relation to each other and to said kerf, permit introduction of the end of the key to seated position in the latter wherein said key is operative for rotating said member to actuate movement of said pin to retracted position.

3. A nut-locking bolt structure comprising a bolt having a threaded end portion and having a central longitudinal bore in said portion, said bolt being also provided with transversely extending alined holes opening into said bore adjacent to the inner end of the latter, a lengthwise shiftable pin having its ends received in said holes and having a pawl-like end, a nut threaded for adjustment on said bolt and having thread intersecting grooves adapted for the reception of said pawl-like end of the pin, tension means normally tending to maintain said pin in its outwardly shifted position, a stud carried by said pin, a cylindrical member rotatably mounted in said bore adjacent to said pin, said member having in its inner end a cam socket in which said stud is received, said stud and the walls of said socket being adapted to cooperate, when said member is rotated in one direction, for actuating retraction of said pin against the pressure of said tension means, a key adapted to operatively engage said member for rotating the latter, and key-shiftable means disposed in said bore to prevent introduction of instrumentalities other than said key into actuating relation to said member.

In testimony whereof, I affix my signature.

RAY H. BLAIR.